Dec. 6, 1960 P. K. WEIMER 2,963,604

TELEVISION CAMERA TUBES

Original Filed Oct. 4, 1954 3 Sheets-Sheet 1

INVENTOR.
Paul K. Weimer

BY William A. Zalesak
ATTORNEY

INVENTOR.
Paul K. Weimer
BY William A. Zalesak
ATTORNEY

Dec. 6, 1960 P. K. WEIMER 2,963,604

TELEVISION CAMERA TUBES

Original Filed Oct. 4, 1954

3 Sheets-Sheet 3

INVENTOR.
Paul K. Weimer

BY William A. Zalesak
ATTORNEY

United States Patent Office 2,963,604

Patented Dec. 6, 1960

2,963,604

TELEVISION CAMERA TUBES

Paul Kessler Weimer, Princeton, N.J., assignor to Radio Corporation of America, a corporation of Delaware Original application Oct. 4, 1954, Ser. No. 460,047. Divided and this application Sept. 12, 1957, Ser. No. 684,391

3 Claims. (Cl. 313—66)

This application is a division of an application filed October 4, 1954, Serial Number 460,047, now abandoned.

This invention relates to television pickup, or camera, tubes and particularly to an improved target structure for television camera tubes.

In conventional camera tubes of the orthicon type, the target comprises a photosensitive surface located on one side of a thin sheet of insulating material. On the opposite side of the sheet of insulating material there is provided a semi-transparent conducting sheet which functions as a signal plate. The capacity of the target is determined by the thickness of the insulating material. The light from a scene to be televised causes photoemission from the photosensitive surface in accordance with the light falling on each part of the photosensitive surface. As a result, a charge pattern is developed that corresponds to the original scene. Due to this charge pattern, an electron beam directed toward the target is modulated at each point on the target by an amount corresponding to the light coming from the original scene. By means of the capacitive coupling between the signal plate and the photoemissive surface, the signal plate picks up this modulation which results in an output signal of the tube.

In conventional camera tubes of the image orthicon type, the image section includes a photocathode electrode upon which a scene to be televised is projected. Photoelectrons released from the photocathode by the light from the image are focused and directed upon a target of insulating material releasing secondary electrons. This establishes a charge pattern on the target corresponding to an optical image focused on the photocathode. The opposite surface of the target is scanned by a low velocity electron beam. Electrons from this beam land on the target, in accordance with the charge pattern, to discharge the charge pattern. The uncollected beam electrons are reflected back toward the gun providing a return beam. The reflected portion of the scanning beam, minus the collected electrons, is collected by an output electrode and thus provides a video television signal. The image orthicon camera tube is fully described in the literature.

When utilizing the conventional target structures in the orthicon type of camera tube, certain instabilities occur under certain conditions. These instabilities occur when utilizing the tube with extremely bright light. Under bright light conditions, there may be more electrons emitted from the photoemissive surface than the electron beam can replace in one scan. If the bright light remains a spot will develop on the target electrode which is more positive with respect to the cathode of the electron gun than the first cross-over point of the secondary emission curve, that is more photoelectrons leave the target than are replaced by beam electrons. Once a spot becomes more positive than the first cross-over point of the secondary emission curve, the electron beam will drive the target more and more positive until the whole target goes to the positive potential of the collector electrode. Under these conditions the picture is blanked out.

Since all pickup or camera tubes are used in conjunction with kinescope receiving tubes, it is desirable to have the signal response of the camera tube in combination with the signal response of the kinescope equal to approximately unity. The unity signal response is desirable in order to provide an ultimate picture as nearly like the original scene as possible. Due to the fact that the light output of the kinescope is approximately proportional to the input signal current raised to the 2.2 power, it is desirable to have the output signal currents from the camera tube vary as the light input raised to the 1/2.2 power.

Still further, in the prior art types of pickup, or camera, tubes it has been relatively difficult to convert the standard black and white camera tubes to pickup tubes for tricolor television transmission.

It is therefore an object of this invention to provide a novel pickup tube.

It is another object of this invention to provide a new and improved camera tube having improved stability for substantially all light levels.

It is a further object of this invention to provide a new pickup or camera tube in which the capacity thereof may be determined by the spacing of signal strips in the target.

It is a still further object of this invention to provide an improved camera or pickup tube having a signal response which varies with the light input of the camera tube raised to a power of less than unity.

Another object of this invention is to provide a pickup tube having higher output signals for a given input signal.

It is yet another object of this invention to provide a new and improved target structure for a pickup tube.

It is a still further object of this invention to provide a new and simplified camera or pickup tube for use in the transmission of television pictures in color.

These and other objects are accomplished in accordance with this invention by providing a pickup tube including a target structure comprising a plurality of narrow conducting lines on an insulating support member. The surface of the insulator between the conducting lines, or strips, is covered with a photoemissive material. The storage area for this type of target is between the conducting lines and is substantially parallel to the plane of the target. The target may also include color filter strips of various colors, such as the conventional red, green and blue color filters for tri-color operation. Thus, storage of a signal in an area substantially parallel to the target is provided in an image orthicon type of tube.

The novel features which are believed to be characteristic of this invention are set forth with particularity in the appended claims. The invention itself will best be understood by reference to the following specification when read in connection with the accompanying three sheets of drawings wherein:

Figure 1:
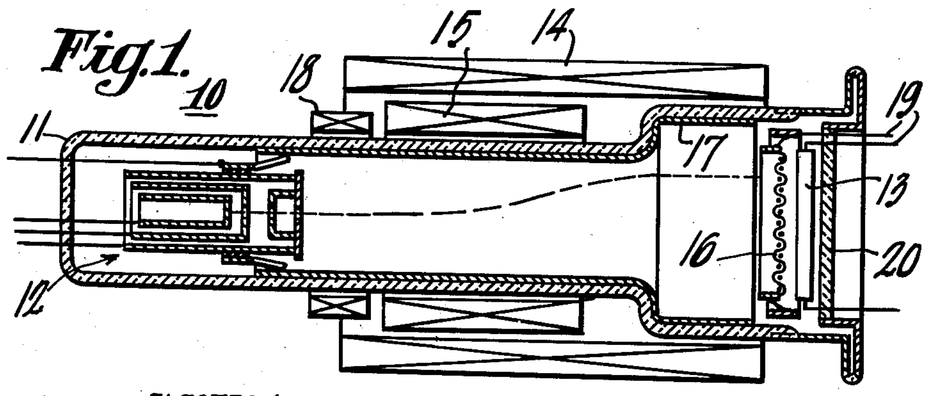
Fig. 1 is a longitudinal sectional view of an orthicon type of tube utilizing a target, which is schematically shown, in accordance with this invention.

Referring now to the drawings in detail, and in particular to Fig. 1, pickup tube 10 comprises a vacuum tight envelope 11 with an electron gun 12 mounted in one end thereof. The electrodes of the electron gun include the usual cathode, control electrode and one or more accelerating anodes which are connected to lead-in pins in a well-known manner. An electron beam from the gun 12 is directed upon a target 13 at the other end portion of envelope 11. Means are provided for focusing the electron beam and scanning the beam over target 13 to form a raster and may include a focus coil 14 and a deflection yoke 15 as well as an alignment coil 18 as shown. An electrode 16, permeable to the electron beam, is positioned adjacent to target 13 and during operation, together with focus coil 14, functions to insure that the electron beam in its final approach to the surface of target 13 is normal thereto. A final accelerating electrode 17 is provided in the form of a conductive coating on the interior of envelope 11. Fingers mounted on gun 12, but insulated therefrom, serve to connect coating 17 to one of the lead-in pins.

Figure 2:
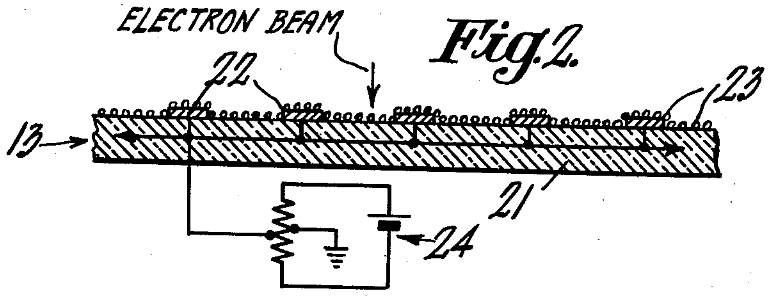
Fig. 2 is an enlarged fragmentary sectional view of the target schematically shown in Fig. 1.

Target 13, which embodies my invention, is conveniently supported adjacent to the transparent window 20 and terminal pins 19 are sealed through the envelope and are connected thereto. As shown more clearly in Fig. 2, target 13 comprises a support or backing plate 21 preferably of a transparent insulating material such as glass. Spaced apart, on the beam side of support plate 21, is a plurality of conducting signal strips 22. Covering the plurality of signal strips 22, and the exposed areas of support plate 21 between the signal strips 22, is a photoemissive mosiac 23, i.e. a large plurality of separated photoemissive islands. Each of the plurality of signal strips 22 is connected to a lead-in. The lead-ins are connected together and to a signal output circuit represented as a circuit 24. The lead-ins for each of the signal strips 22 are shown as coming through the support plate 21 for simplicity of illustration. In practice, the ends of the signal strips 22 would be connected inside the tube 10 to a common lead which could extend through the face of envelope 11. It should be understood that the transparent end 20 of envelope 11 can function as a support plate, or the support plate 21 may be mounted inside the tube 10 adajcent to the transparent end 20.

The support plate 21 may be any transparent plate such as glass, mica, or quartz, and may be of any thickness ranging from one-eighth of an inch to less than one ten-thousandth of an inch. Alternatively, the support plate 21 may comprise a thin transparent film such as aluminum oxide supported on a ring, or coated on the transparent end 20 (of Fig. 1). The film of aluminum oxide may be approximately 1000 Angstrom units in thickness.

The signal strips 22, which may be either transparent or opaque, may be formed of any highly conductive material such as aluminum, gold, or tin oxide, and may be approximately 100 to 1000 Angstrom units thick. The width of each of the signal strips 22 may be approximately one-half of a thousandth of an inch. The total number of signal stirps 22 in the target area may be from approximately 500 to several thousand which will depend upon the size of the tube and also the quality of picture desired. The spacing between strips may vary within the approximate range of one-half a thousandth to one and one-half thousandths of an inch also depending upon the quality of picture desired. The number of signal strips 22 is preferably as large as possible with the width of the individual signal strips being very narrow for highest definition of the picture. It should be understood that the signal strips 22 may be in the form of a fine mesh screen when desired. The signal strips 22 may be applied to the support plate 21 by any conventional means such as evaporation, by ruling of the strips, or by photoengraving techniques.

Figure 4:
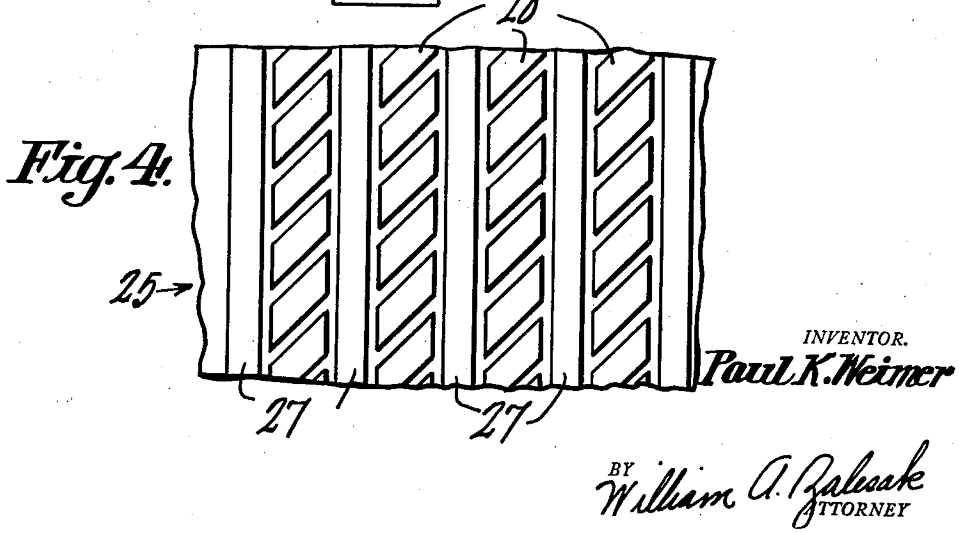
Fig. 4 is an enlarged fragmentary plan view of the target structure shown in Fig. 3.

The photoemissive material 23 may be any of the well-known photoemissive materials such as cesiated silver oxide, cesiated silver-bismuth combination, or cesiated antimony. As an example of applying the photoemissive material, and assuming cesiated silver oxide, a thin layer of silver is evaporated on the support plate 21 and the signal strips 22. The silver is then baked to break it into small globules insulated from each other. The layer of silver is then oxidized after which it is cesiated which forms a photoemissive surface having sufficient insulation to prevent leakage between silver globules. for the silver-bismuth combination, and for cesiated antimony surfaces, it is preferably to evaporate the metal in islands, as shown in Figure 4, which may be done through an apertured mask to insure proper insulation.

During operation of the tube 10, appropriate voltages are applied to the electrodes and the electrons from gun 12 are formed into an electron beam and urged toward the target 13. The electron beam is scanned across the surface of target 13 in a rectangular raster by magnetic deflecting fields produced by a conventional deflecting yoke 15. The deflection yoke 15 normally consists of two pairs of magnetic coils with coils of each pair connected in series and poistioned on opposite sides of the tube envelope 11. The pairs of coils are arranged so that the field produced by one pair is substantially normal to the field of the other pair. Each pair of coils is connected to appropriate sources of potential (not shown) to produce both horizontal and vertical deflection of the electron beam in a conventional manner to provide a rectangular scansion raster. The means for producing this type of scansion of the electron beam is well-known and is not considered further as it is not a part of this invention.

During operation, a direct current potential is applied to the signal strips which is of a magnitude that is near the potential of the cathode of gun 12. This potential on signal strips 22 stabilizes the target 13 against "charge-up" which is caused in convention orthicons when an extremely bright scene is focused on the target.

When a scene to be transmitted is focused on the target 13 the scene builds up a charge pattern, in the insulated areas between the strips, by means of photoemission, corresponding to the light and shade in the original scene. This charge pattern modulates the electron beam that is reflected from the target 13. The signal strips 22 pick up the modulation by capacitive coupling to the insulated areas and the modulated signal is fed to the first amplifier stage as represented by circuit 24. The electrical capacity of the areas wherein the charge is stored is determined by the width of, and spacing between, the signal strips 22. The charge is stored in elemental capacitors the electrodes of which are disposed laterally across target 13 as distinguished from conventional target wherein the charge is stored in a capacitor formed transversely through the target. As is obvious, since the capacity of the target 13 is determined by the width and spacings between signal strips 22, and capacity of the target may be varied by varying the width and spacings of the signal strips 22. While the invention has been described in connection with scanning by means of a low velocity electron beam, it should be noted that target 13 may be scanned by a high velocity electron beam, thus serving as a target for a lateral storage iconoscope. Further, by properly biasing the strips 22 a few volts positive with respect to cathode potential an increased video signal can be achieved by the storage area modulating the beam current landing on the signal strips 22.

Figure 3:
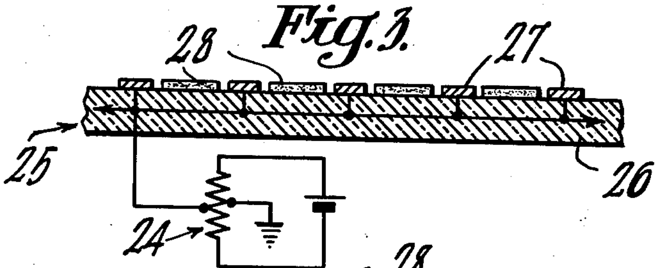
Fig. 3 is an enlarged fragmentary sectional view of a modification of a target structure in accordance with this invention.

Referring now to Figs. 3 and 4, there is shown respectively an enlarged fragmentary sectional view and an enlarged fragmentary plan view of a lateral storage target in accordance with a modification of this invention. The target 25 comprises a support plate 26 having, on the surface thereof toward the electron beam, a plurality of spaced apart signal strips 27. Spaced in between each pair of signal strips 27 is a plurality of spaced apart islands of photoemissive material 28. The target 25 differs from target 13 in that the photoemissive material 28 is arranged as small islands of material. The purpose of the photoemissive islands 28 is to obtain satisfactory insulation with photoemissive surfaces which are themselves normally too conductive to be broken into insulating globules by heat treatment, resulting in a more sensitive mosaic. The photoemissive islands 28 can be obtained by evaporating the metallic component thereof through a fine mesh screen (not shown) to give the regular array of photoemissive islands shown in Fig. 4. The photoemissive islands can be completely conductive and processed for the maximum sensitivity. As shown more clearly in Fig. 4, the photoemissive islands 28 can be at an angle with respect to signal strips 27, and each of the islands 28 takes the form of a parallelogram, to minimize the moire effect between scanning lines and photoemissive areas. In this modification the signal strips 27 can also taken the form of a fine mesh electrode with the cross elements thereof being spaced between adjacent photoemissive islands.

The elemental capacitor in which the charge is stored on target 25 is formed by a photoemissive island 28 and an adjacent signal strip 27. As is obvious, the capacity of the storage capacitor can be varied by varying the spacing between the photoemissive islands 28 and the signal strips 27. The materials of target 25, as well as the means for operating the target 25, are substantially the same as disclosed in connection with Figs. 1 and 2 and further description thereof is not deemed necessary.

Figures 5, 6, 9:
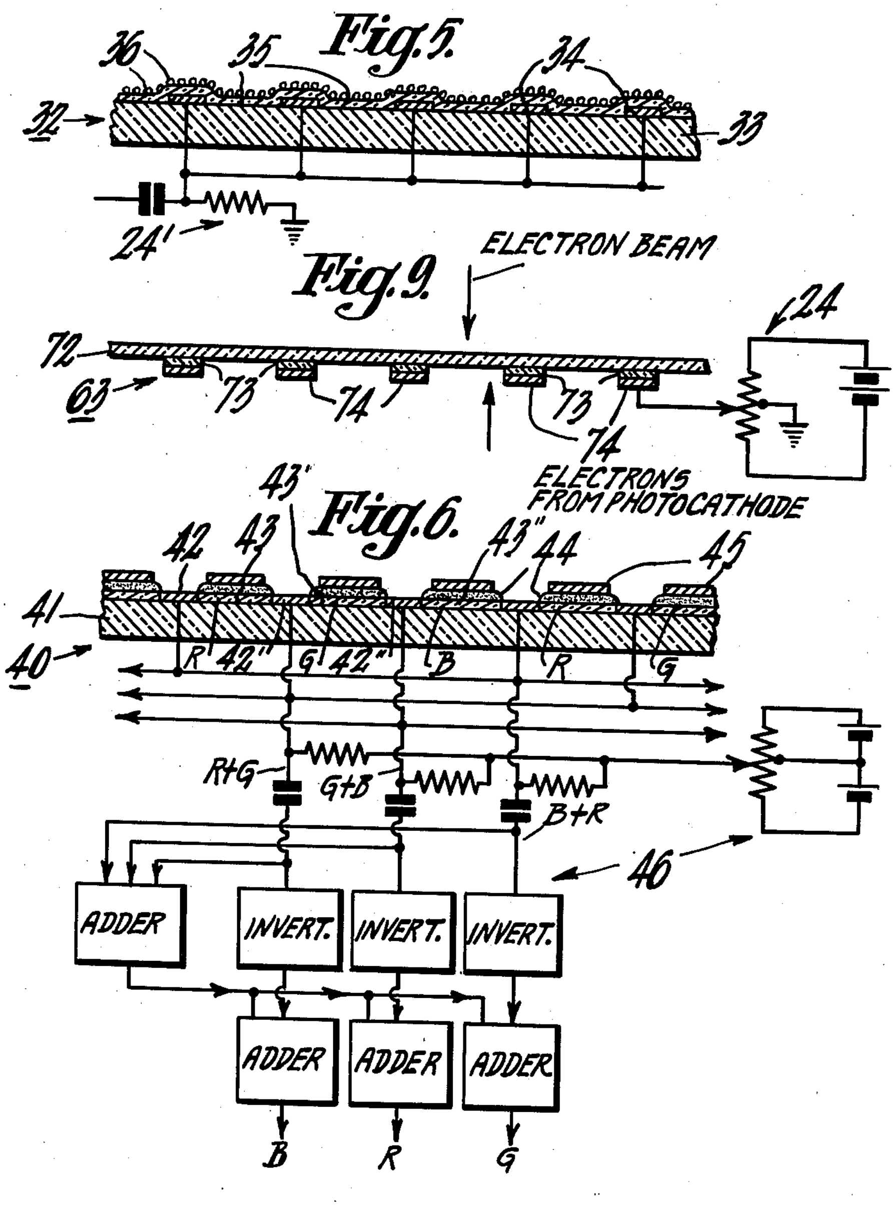
Fig. 5 is an enlarged fragmentary sectional view of a modification of a target structure in accordance with this invention.
Fig. 6 is an enlarged fragmentary sectional view of a modification of a target structure in accordance with this invention for use in a tri-color tube of the orthicon type shown in Fig. 1.
Fig. 9 is an enlarged fragmentary sectional view of the structure schematically shown in Fig. 8; and, Fig. 10 is an enlarged fragmentary sectional view of a modification of a target structure in accordance with this invention for use in a tri-color tube of the image orthicon type shown in Fig. 8.

Referring now to Fig. 5, there is shown a fragmentary sectional view of a lateral storage monochrome target in accordance with this invention. The target 32 comprises a support, or backing, plate 33. Supported on the surface of support plate 33 is a plurality of spaced apart signal strips 34. Covering all of the plurality of signal strips 34, and the exposed areas of support plate 33 between the signal strips 34, is a thin film of insulating material 35. On the exposed surface of insulating material 35 is a photoemissive layer 36. The insulating material 35 may be any of the well-known insulating materials such as evaporated aluminum oxide or silicon dioxide. The insulating material 35 may be of a thickness within the range of approximately 100 to 100,000 Angstrom units. The other materials, and also the operation, of target 32 are substantially the same as that described hereinbefore. When utilizing target 32, including the film of insulating material 35, spurious signals which may arise from non-uniformity of the surfaces of strips 34 are substantially eliminated; also, the requirement for a uniform landing of the electron beam may be reduced. However, the insulation 35 reduces the effectiveness of the strips 34 in stabilizing the target 32 against charge up and reduces the possibility of varying the modulated signal by grid control action.

Referring now to Fig. 6, there is shown an enlarged fragmentary sectional view of a modification of a target structure in accordance with this invention which is designed for use as a tri-color pickup tube target. The target 40 comprises a support, or backing, plate 41 having on one surface thereof a plurality of spaced apart signal strips 42, 42′ and 42″. In between, and contiguous with, each adjacent pair of signal strips 42, 42′ and 42″ is an insulating color filter 43, 43′ and 43″ each of which is responsive to light of a different color such as the red, blue and green portions of the spectrum respectively. As can be seen from the drawing, signal strips 42 are between a blue and red color filter 43″ and 43 respectively, signal strips 42′ are between a red and a green color filter 43 and 43′ respectively, and signal strips 42″ are between the green and blue color filters 43′ and 43″, whereby signal strips 42 pick up the blue and red signals, signal strips 42′ pick up the red and green signals, and signal strips 42″ pick up the green and blue signals.

When a photoemissive material is utilized which may be harmful, due to chemical reaction, to the color filter strips 43, 43′ and 43″ a thin insulating film 44 may be utilized. When a photoemissive material is utilized which is not harmful to the color filters 43, 43′ and 43″ the insulating film 44 is preferably omitted. When an insulating film is required, an insulating film 44 is provided over each of the color filter strips 43, 43′ and 43″. Covering each of the plurality of thin insulating films 44, or each of the color filter strips 43, 43′ and 43″ when no insulation is utilized, is a layer of photoemissive material 45. The photoemissive material is preferably arranged in islands as shown in Fig. 4. The strips of insulating film 44, when utilized, may be of any well-known insulating material such as magnesium fluoride, quartz, or aluminum oxide and may be of a thickness up to 1 micron. The insulating strips 44 are provided for the purpose of protecting the color filters 43, 43′ and 43″ from chemical reaction with the photoemissive material 45. As is obvious, when there is no danger of chemical reaction between the photoemissive material 45 and color filter strips 43, 43′ and 43″ insulating strips 44 may be omitted. The color filters 43, 43′ and 43″ may be responsive to any of the primary colors and the red, green, blue sequence is shown merely as being illustrative of the invention. The color filters 43, 43′ and 43″ may be any insulating color filters as multi-layer interference filters. The multi-layer interference filters are normally made of alternate layers of high index material, such as zinc sulfide, and a low index material, such as magnesium fluoride, with the thickness of each layer chosen to give the desired color. Of course, it should be understood that other types of insulating color filter strips may be utilized to derive the various color signals.

The operation of target 40 is substantially that as has previously been described except that each of the signal strips picks up signals of two of the primary colors. These signals are added to make the total white signal. The signal output from each strip, corresponding to the sum of the two primary colors, is subtracted from the total white signal to give each primary color signal. This may be accomplished by any of the well-known circuits such as circuit 46 which is schematically shown.

Figure 7:
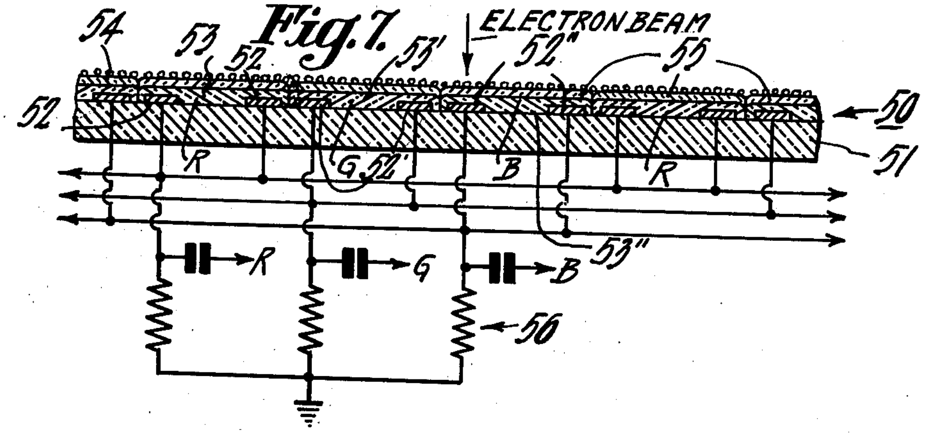
Fig. 7 is an enlarged fragmentary sectional view of a further modification of a target structure in accordance with this invention for use in a tri-color tube of the orthicon type shown in Fig. 1.

Referring now to Fig. 7, there is shown an enlarged fragmentary sectional view of an embodiment of a lateral storage target in accordance with this invention for use in a tri-color pickup tube. The target 50 comprises a transparent support plate 51 having a plurality of pairs of signal strips 52, 52′ and 52″ on one surface thereof. Each of the pairs of signal strips are for one of the primary colors and, as shown, a pair of signal strips 52 is for red, a pair of signal strips 52′ for green, and a pair of signal strips 52″ for the blue. Included in the target 50 is a plurality of color filter strips 53, 53′ and 53″ for the red, green and blue colors respectively. As shown each of the color filter strips 53, 53′ and 53″ cover a pair of signal strips 52. It should be understood that the color filter strips could, in the alternative lie under, or between the signal strips. Color filter strips 53 each cover a pair of signal strips, such as signal strips 52, and support plate 51 therebetween; while color filter strips 53′ each cover a pair of signal strips 52′ and the support plate 51 therebetween; and color filter strips 53″ each cover a pair of signal strips 52″ and the support plate 51 therebetween. Covering each of the color filter strips 53, 53′ and 53″, is a plurality of strips of insulating material 54. Here again the insulating material 54 is provided for the purpose of protecting the color filter strips from chemical reaction with the photoemissive material. The insulating material is preferably omitted when no such chemical reaction is likely. As shown, the insulating material is constructed of a plurality of continuous strips of insulating material. Other constructions for the insulating material 54 can also be utilized such as a continuous sheet of insulating material. Disposed on the surface of the strips of insulating material 54, and preferably between the areas adjacent to signal strips 52 in a form as described in connection with Fig. 4, is a photoemissive material 55. The photoemissive material 55 is preferably arranged in "islands" as previously described.

The purpose of insulating coating 54 is to protect the color filters 53, 53′ and 53″ from chemical reaction with the mosaic. Also, the insulating material 54 prevents the electron beam from landing directly on the signal strips 52, 52′ and 52″. The materials disclosed in connection with Fig. 6 may also be used in target 50. The operation of target 50 is substantially the same as that described in connection with target 40 with the exception being that each pair of signal strips 52, 52′ and 52″ is connected to an output circuit 56 whereby the signal representing the three primary colors from filters 53, 53′ and 53″ is reproduced directly.

Figures 8, 10:
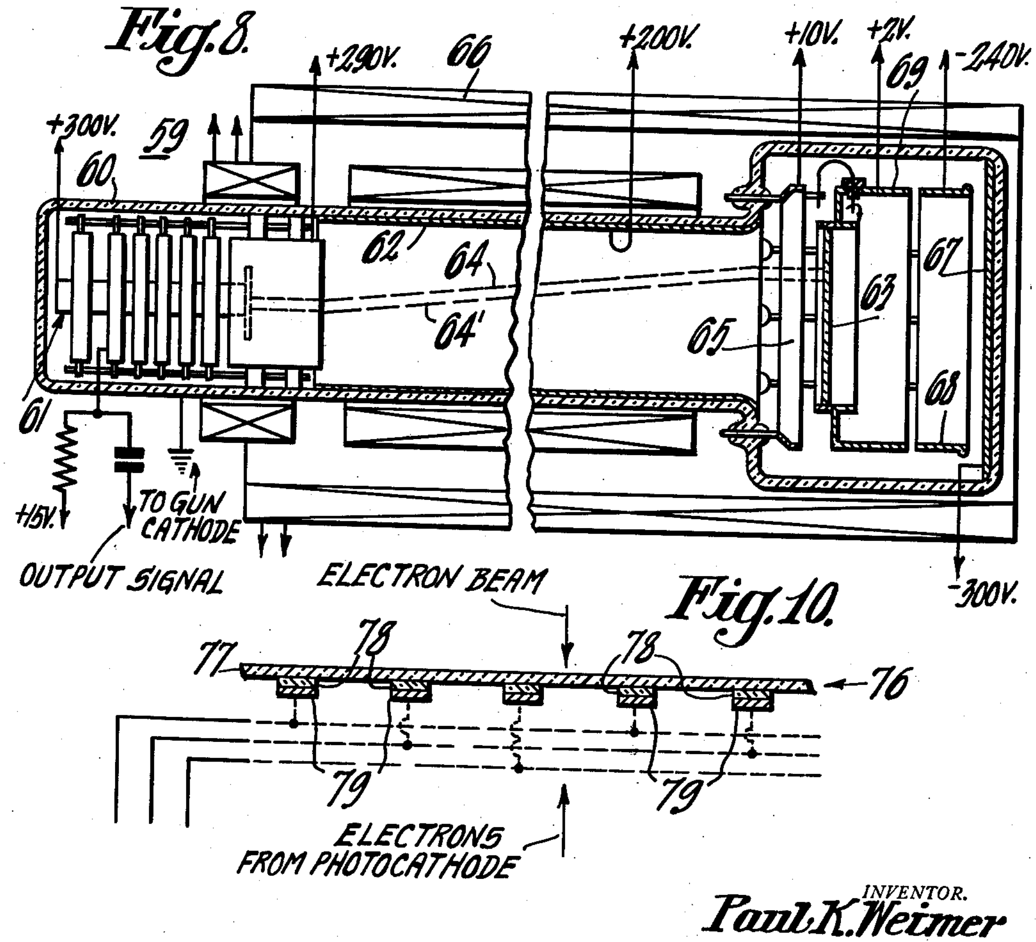
Fig. 8 is a longitudinal sectional view of an image orthicon type of camera tube utilizing a target, which is schematically shown, in accordance with this invention.

Referring now to Fig. 8 there is shown a transverse sectional view of an image orthicon type of tube utilizing a lateral storage target in accordance with this invention. Generally, the image orthicon tube 59 comprises an envelope 60 having an enlarged portion at one end for enclosing an image section to be described. Within the opposite end of the tubular envelope 60 is an electron gun structure 61 comprising conventional heater, cathode, and control grid structures (not shown) for producing an electron beam 64. An additional accelerating electrode 62 is formed as a wall coating on the inner surface of the tube envelope, for accelerating the electron beam 64 toward the target electrode 63. Pairs of horizontal and vertical deflection coils are formed into a yoke structure surrounding the tube envelope. The deflection coils provide fields perpendicular to each other and to the tube axis. The deflecting coils are connected to sources (not shown) of sawtooth currents for providing frame and line scansion of the electron beam 64 over the surface of target 63. Such deflection systems are well-known in the art and therefore the deflection means is not described further as it does not constitute a part of this invention.

A decelerating electrode 65, formed as a ring, is mounted within the envelope immediately in front of target electrode 63 and on the scanned side thereof. A low potential established on the decelerating electrode 65 brings the velocity of the electron beam 64 to substantially zero in front of the surface of target 63. Surrounding the tube envelope is a focusing coil 66 for providing a magnetic field having lines of force substantially parallel to the tube axis and extending from the end of the gun structure 61 and from the end of the enlarged portion of envelope 60. The field of coil 66 provides a focusing action on the electrons of beam 64 to bring them to a small well defined point of focus on the surface of target 63.

Within the opposite end of the tube envelope 60 there is formed a photocathode electrode 67. Such a photocathode surface may be any conventional photocathode materials such as that formed from a sensitized alloy of silver-bismuth.

First and second accelerating electrodes 68 and 69 are mounted coaxial to the tube envelope and are spaced from the photoelectric cathode 67 and target 63. These electrodes provide accelerating and converging electrostatic fields in front of the photocathode 67 to urge the photoelectrons therefrom toward the target electrode 63 at a high velocity. The combined action of the electrostatic field and the magnetic field converges the electron image in order that it may land on the smaller area of the target 63. The voltage of accelerating electrode 68 is variable so that the accelerating field between electrodes 68 and 69 can be adjusted to eliminate distortion of the picture. Target electrode 63 will be described in greater detail in connection with Fig. 9. Photoelectrons from photocathode 67 strike the adjacent surface of target 63 with sufficient energy to provide a secondary emission therefrom greater than unity.

Referring now to Fig. 9 there is shown an enlarged fragmentary sectional view of target 63 in accordance with this invention. The target 63 comprises a thin semi-conducting member 72 having a plurality of spaced apart insulator strips 73 on the side thereof adjacent photocathode 67, see Fig. 8. A plurality of conducting strips 74 is provided, each of which is disposed on one of the insulating strips 73. Each of the plurality of conducting strips 74, which function as signal strips, is connected to an output circuit 24 although only one connection is shown for simplicity of illustration. The thin insulating strips 73 are provided for the purpose of supporting a potential difference which may be desired to eliminate contact potential differences between the two sides of semi-conducting member 72. The thin insulating strips 73 may be omitted and the signal strips 74 applied directly to the semi-conducting member 72. As can be seen from Fig. 9, the charge storage area is between an exposed area of insulating strips 73 and the adjacent signal strips 74. This charge storage is substantially parallel to the plane of semi-conducting member 72. The materials for target 63 may be substantially the same as those previously described in connection with the orthicon type lateral storage targets, while the thin semi-conductor 72 may be a material such as lime glass.

Referring now to Figs. 8 and 9, the operation of tube 59 is briefly as follows: with no illumination on photocathode 67, the electron beam 64 is scanned across the surface of the semi-conductor 72 in target 63. Low energy electrons from the beam 64 land on the target surface and drive the surface to substantially zero or cathode potential. At this point, the remaining electrons of the beam are reflected toward gun 61. When a light pattern is directed onto photocathode 67, photoelectrons are emitted from each elemental portion of the photocathode in an amount proportional to the light and shade of the original scene. The photoelectrons strike the surface of the semi-conducting member 72 and initiate secondary emission therefrom. Due to the beam velocity, the secondary emission has an emission ratio greater than unity from the bombarded areas which drives these areas in a positive direction toward the potential of signal strips 74. In this manner, there is set up on the photocathode side of semi-conductive member 72, in the areas between the conducting strips 74, a charge pattern corresponding to the pattern of the original scene focused upon the photocathode 67. Due to the thinness of the semi-conductive member 72, with the resulting high capacity between the two sides, the same potential pattern is established on the scanned, or electron gun, side of film 72. Accordingly, the potential of the scanned surface of semi-conductive member 72 will vary from point to point, from substantially zero voltage to the several volts positive potential of collector screen 74.

The electron beam 64 will approach target electrode 63 at a very low velocity immediately in front of the surface of semi-conductive member 72. When the beam approaches target areas which are at zero potential, the beam is reflected back toward the electron gun 61. However, a more positive area of the target surface causes electrons from the primary beam to land in numbers sufficient to neutralize the positive potential charge at these areas and thus, discharge these areas of the target to cathode potential. The remaining electrons of the beam 64 are then reflected back in the gun of the tube. In this manner, as the electron beam is scanned over the target surface, there is reflected toward the gun end of the tube a modulated return beam 64'. The return beam 64' follows substantially the same path as the incident beam 64 and strikes the end of the gun structure which is formed as a dynode electrode and is the first stage of a multiplier section. The multiplier may be of any conventional type. The modulated beam 64' is converted into output signal voltages from the collector electrode of the multiplier section. In other words, an image orthicon utilizing this invention operates substantially the same as conventional image orthicons except that the charge is stored laterally across the target. A target in accordance with this invention avoids the possibility of microphonics between the glass and conventional target screens.

Referring now to Fig. 10 there is shown an enlarged fragmentary sectional view of an embodiment of a lateral storage target in accordance with this invention which is adapted for use in a tri-color image orthicon type of tubes. The target 76 comprises a thin semi-conductive member 77 having a plurality of spaced apart insulating strips 78 on the photocathode side thereof. There is provided a plurality of conducting strips 79 each of which is supported over an insulating strip 78. As can be seen from the drawing, every third one of the strips 78 is connected to a separate lead-in. Each of the lead-ins represents the bias signal for a separate primary color signal coming from the photocathode.

When utilizing target 76, light filter strips (not shown) may be utilized outside the envelope or between the photocathode and the end of the envelope. The electrons from the photocathode areas over the color filter strips, which are in registration with the semi-conductive member between the signal strip 79, are urged, by well-known electron optical techniques, to fall on the semi-conductive member 77 in the areas between signal strips 79. The operation of target 76, as well as the materials therefor, is substantially the same as that previously described in connection with Figs. 8 and 9. The primary difference in operation is that every third conducting strip 79 provides the bias for the charge pattern for one of the primary colors. The color filter strips may be in registration with the signal strips 79 when the color filter strips are wider than the signal strips so that electrons from one color land on the semi-conductive member 77 on both sides of the respective signal strips 79. In target 76 the charge is stored between an exposed area of insulating film 77 and a conducting strip 79, in other words, substantially lateral to the target 76.

What is claimed is:

1. An electron discharge device comprising an elongated envelope, an electron gun in one end of said envelope, a photo-emissive cathode in the other end of said envelope, a target electrode mounted on a substantially straight line between said electron gun and said photo-emissive cathode and within said envelope, said target electrode comprising a semi-conducting member, and a plurality of spaced apart conducting strips supported by means including said semi-conducting member and substantially co-extensive with said semi-conducting member.

2. A target for a television tube comprising a semi-conductor supporting member, a plurality of strips of insulating material each supported on said supporting member, a plurality of spaced apart signal output electrodes each on a different one of said strips of insulating material so that electrical charges are stored on said semi-conductor substantially parallel to said supporting member.

3. A target for a television pickup tube as in claim 2 wherein at least every third one of said signal output electrodes is electrically connected together.

References Cited in the file of this patent

UNITED STATES PATENTS

| | | |
|---|---|---|
| 2,589,386 | Huffman | Mar. 18, 1952 |
| 2,618,700 | Weimer | Nov. 18, 1952 |
| 2,738,440 | Theile | Mar. 13, 1956 |
| 2,749,471 | Rittner | June 5, 1956 |
| 2,753,483 | Lubszynski et al. | July 3, 1956 |
| 2,757,112 | Hoyt | July 31, 1956 |
| 2,776,387 | Pensak | Jan. 1, 1957 |